US012617329B2

(12) United States Patent
Kocer et al.

(10) Patent No.: US 12,617,329 B2
(45) Date of Patent: May 5, 2026

(54) COVER SYSTEMS AND METHODS WITH PERFORATED TUNNELS

(71) Applicant: Viaflex, Inc., Sioux Falls, SD (US)

(72) Inventors: Jared Ernest Kocer, Sioux Falls, SD (US); Andre Alan Harvey, Spring Valley, CA (US)

(73) Assignee: Viaflex, Inc., Sioux Falls, SD (US)

( * ) Notice: Subject to any disclaimer, the term of this patent is extended or adjusted under 35 U.S.C. 154(b) by 447 days.

(21) Appl. No.: 18/160,899

(22) Filed: Jan. 27, 2023

(65) Prior Publication Data

US 2023/0234493 A1     Jul. 27, 2023

Related U.S. Application Data

(60) Provisional application No. 63/303,890, filed on Jan. 27, 2022.

(51) Int. Cl.
B60P 7/02          (2006.01)
A01F 25/13         (2006.01)

(52) U.S. Cl.
CPC ............... B60P 7/02 (2013.01); *A01F 25/13* (2013.01)

(58) Field of Classification Search
CPC .......... A01F 25/16; A01F 25/13; A01F 25/14; A01F 2025/147; Y10S 52/12; B60P 7/02; B60P 7/04
USPC ................................................... 52/3, 23, 5
See application file for complete search history.

(56) References Cited

U.S. PATENT DOCUMENTS

| | | | | |
|---|---|---|---|---|
| 4,084,358 | A * | 4/1978 | Winters | E04H 7/30 52/63 |
| 4,122,637 | A * | 10/1978 | Runge | A01F 25/13 52/745.08 |
| 4,224,770 | A * | 9/1980 | Petty | A01F 25/13 52/192 |
| 4,248,343 | A * | 2/1981 | Schaefer | A01F 25/13 206/83.5 |
| 4,413,029 | A * | 11/1983 | Handwerker | B65G 3/02 428/102 |
| 4,897,970 | A * | 2/1990 | Double | A01F 25/13 52/3 |
| 5,197,236 | A * | 3/1993 | Calhoun | A01F 25/13 52/3 |
| 5,291,698 | A * | 3/1994 | Rayner, Jr. | B65G 3/02 52/63 |
| 5,363,605 | A * | 11/1994 | Handwerker | B65G 3/02 52/3 |
| 11,970,050 | B2 * | 4/2024 | Huening | B32B 3/08 |
| 12,251,620 | B2 * | 3/2025 | Martikainen | A63C 19/10 |
| 2003/0140568 | A1 * | 7/2003 | Glynos | A01F 25/13 52/4 |

(Continued)

*Primary Examiner* — Kyle J. Walraed-Sullivan

(74) *Attorney, Agent, or Firm* — Schwegman Lundberg & Woessner, P.A.

(57)          ABSTRACT

Disclosed are cover systems for covering product such as grain. An example cover system includes a cover having at least one perforated tunnel extending across at least a portion of the cover (e.g., with an end to or beyond an edge of the cover). The perforated tunnel can include a bottom membrane with perforations, a cap strip membrane attached to the top side of the bottom membrane, and an air permeable filler material between the bottom membrane and the cap strip membrane. The perforated tunnel can have an air inlet at its end for drawing in air to hold down the cover by suction.

5 Claims, 7 Drawing Sheets

(56) References Cited

U.S. PATENT DOCUMENTS

| 2006/0201070 A1* | 9/2006 | Nale | .......................... | E04H 9/14 |
| | | | | 52/23 |
| 2016/0029566 A1* | 2/2016 | Gaudet | ..................... | E02D 3/00 |
| | | | | 34/232 |
| 2019/0128011 A1* | 5/2019 | Derbes | ..................... | E04H 15/20 |
| 2020/0221641 A1* | 7/2020 | Bird | ....................... | F16M 13/02 |
| 2023/0101649 A1* | 3/2023 | Kocer | ..................... | A01F 25/13 |
| | | | | 52/3 |
| 2023/0234493 A1* | 7/2023 | Kocer | ....................... | B60P 7/02 |
| | | | | 296/100.02 |

* cited by examiner

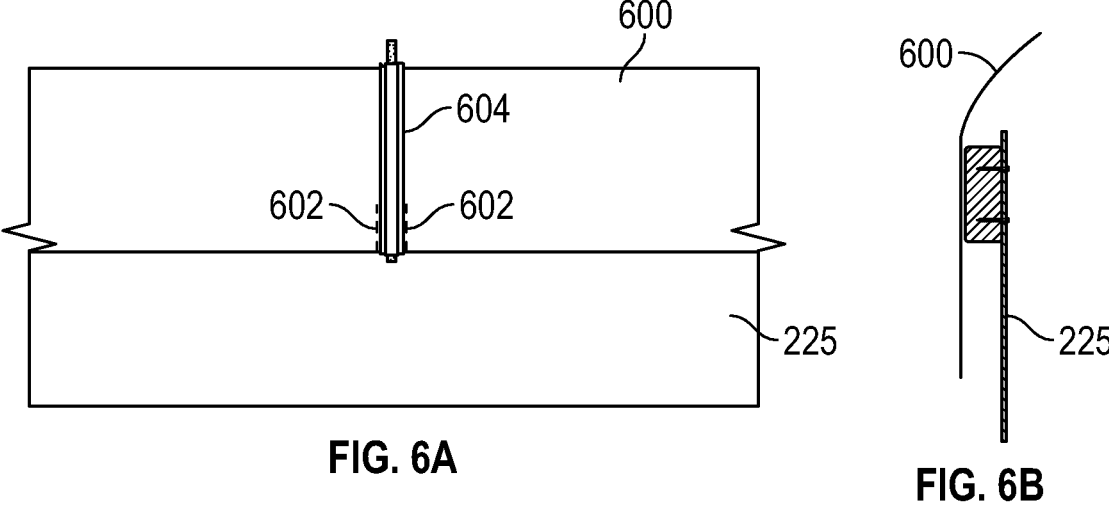
FIG. 6A
FIG. 6B
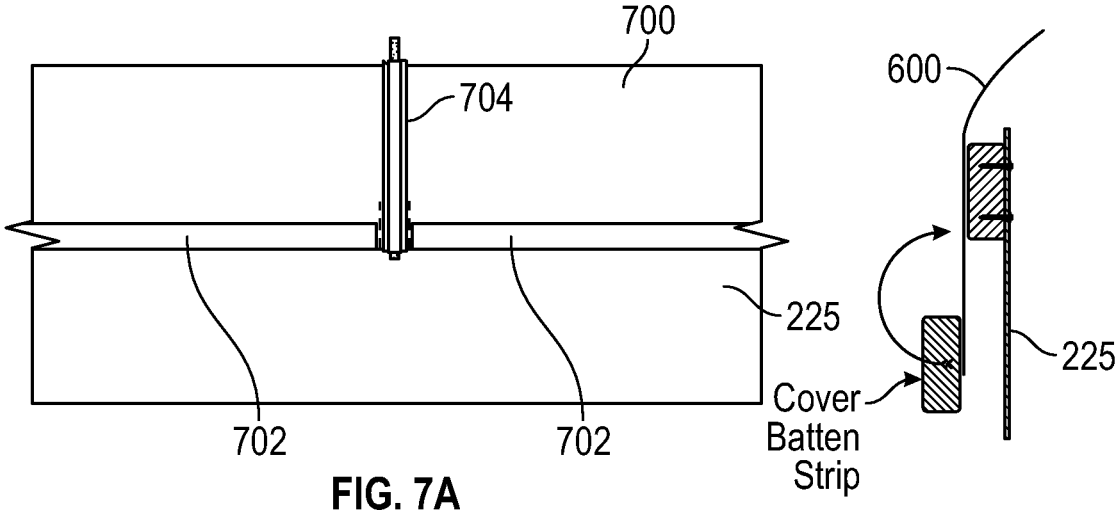
FIG. 7A
FIG. 7B

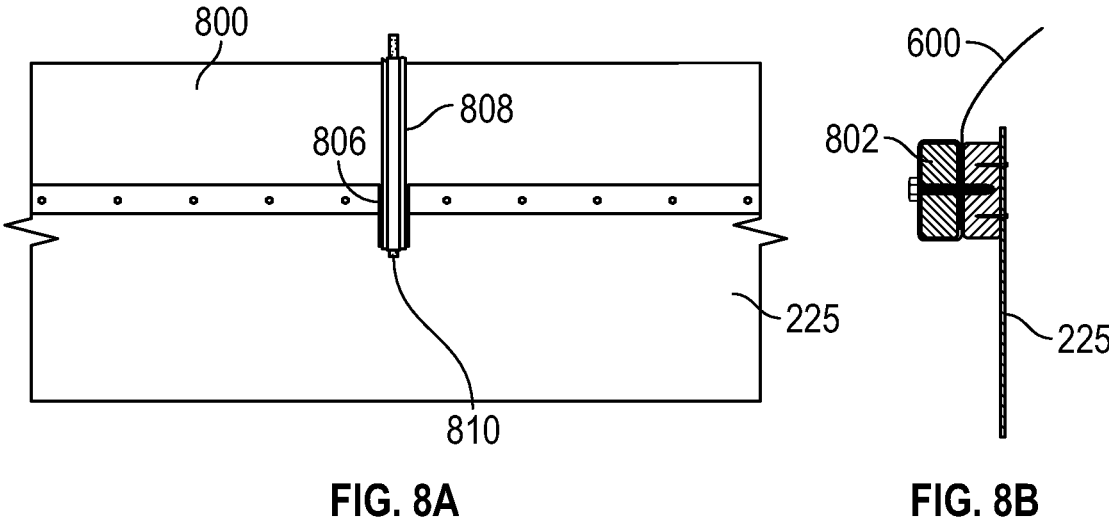
FIG. 8A
FIG. 8B
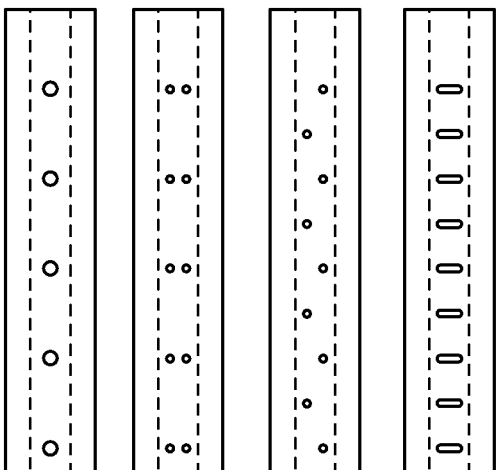
FIG. 9

1200

1220

1250

1240

1280

1225

1230

COVER SYSTEMS AND METHODS WITH PERFORATED TUNNELS

CLAIM OF PRIORITY

This patent application claims the benefit of priority of Kocer et al. U.S. Provisional Patent Application Ser. No. 63/303,890, entitled "COVER SYSTEMS AND METHODS WITH PERFORATED TUNNELS," filed on Jan. 27, 2022, which is hereby incorporated by reference herein in its entirety.

TECHNICAL FIELD

This document pertains generally, but not by way of limitation, to cover systems and methods and, in particular, cover systems and methods for covering products such as grain or hay.

BACKGROUND

Many types of products are stored in outdoor environments including agricultural products such as grain and hay. Covers such as tarps have been used for a long time to cover these products and protect them from the sun and rain. Straps and suction systems are typically employed to hold the cover against the product. The straps typically extend beyond the cover and attach to a structure such as a retaining wall. Suction systems typically include an aeration fan (e.g., a fan or blower), conduits under the product near the center and sides of the pile, and multiple large, perforated tubes located over the product and under the cover. These tubes extend beyond the edges of the cover to an inlet. The aeration fan draws ambient air in through the inlet and down through the perforations in the tubes through the product and out through the aeration fan. This airflow serves to pull the cover against the product, to pull air through the product to dry the product, and to help secure the cover. FIG. 1 illustrates a grain cover being installed with perforated black tubes for aeration.

OVERVIEW

The present inventors have recognized, among other things, that a problem to be solved can include providing cover systems that can be efficiently made and installed. They have recognized, for example, that cover systems that use large, perforated tubes suffer from drawbacks such as being expensive and time consuming to install. The present subject matter can help provide a solution to this problem, such as by providing a cover with perforated tunnels for aeration.

In one example, a cover system includes a cover having at least one perforated tunnel extending across at least a portion of the cover. Each perforated tunnel can include a bottom membrane with perforations, a cap strip membrane attached to the top side of the bottom membrane, and an air permeable filler material between the bottom membrane and the cap strip membrane. The tunnel can further include an air inlet at an end of the tunnel which can be at the edge of the cover. An aeration fan can be provided to draw air through the perforations when installed.

In one example, a method of manufacturing a cover system is provided. The method includes perforating a bottom membrane with a strip of perforations, placing a strip of air permeable material between the perforated bottom membrane and a cap strip membrane, and attaching the cap strip membrane to the bottom membrane to form a cover membrane with a perforated tunnel having a bottom side with the strip of perforations. The cover membrane with the perforated tunnel can be a wide cover section that can be joined with other cover sections (with or without perforated tunnels) to form a full cover. In another example, the cover membrane with the perforated tunnel can be a narrow cover section that can join adjacent, wide cover sections (with or without perforated tunnels).

By providing cover systems with perforated tunnels, the present subject matter can provide one or more of the following advantages. The present systems can be more efficiently made. For example, the present systems avoid the need to supply expensive, long, bulky tubes separate from the cover. The present systems can be more efficiently installed. For example, the present use perforated tunnels and eliminate the need for installers to install separate unsightly, long tubes over the product during installation of the cover. The present systems also avoid the need for storing the tubes in the off season. These and other advantages can be provided by the system and methods described herein.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 6A and 6B illustrates an example cover placement according to embodiments of the present subject matter.

FIGS. 7A and 7B illustrates an example cover placement with a batten strip prior to completion according to embodiments of the present subject matter.

FIGS. 8A and 8B illustrates an example cover placement with a batten strip after attachment according to embodiments of the present subject matter.

FIG. 9 illustrates example perforation patterns according to embodiments of the present subject matter.

DETAILED DESCRIPTION

Figure 1:
FIG. 1 illustrates a perspective view of an example cover system with long tubes for aeration.

The present subject matter provides cover systems with perforated tunnels that can provide aeration for suction against a product being stored. The product can be grain stored in a structure with retaining walls. The subject matter is however not limited to grain covers but can be used with other products. Covers with perforated tunnels can provide significant advantages over prior covers that rely on long, bulky tubes such as those shown in FIG. 1.

Figures 2, 3:
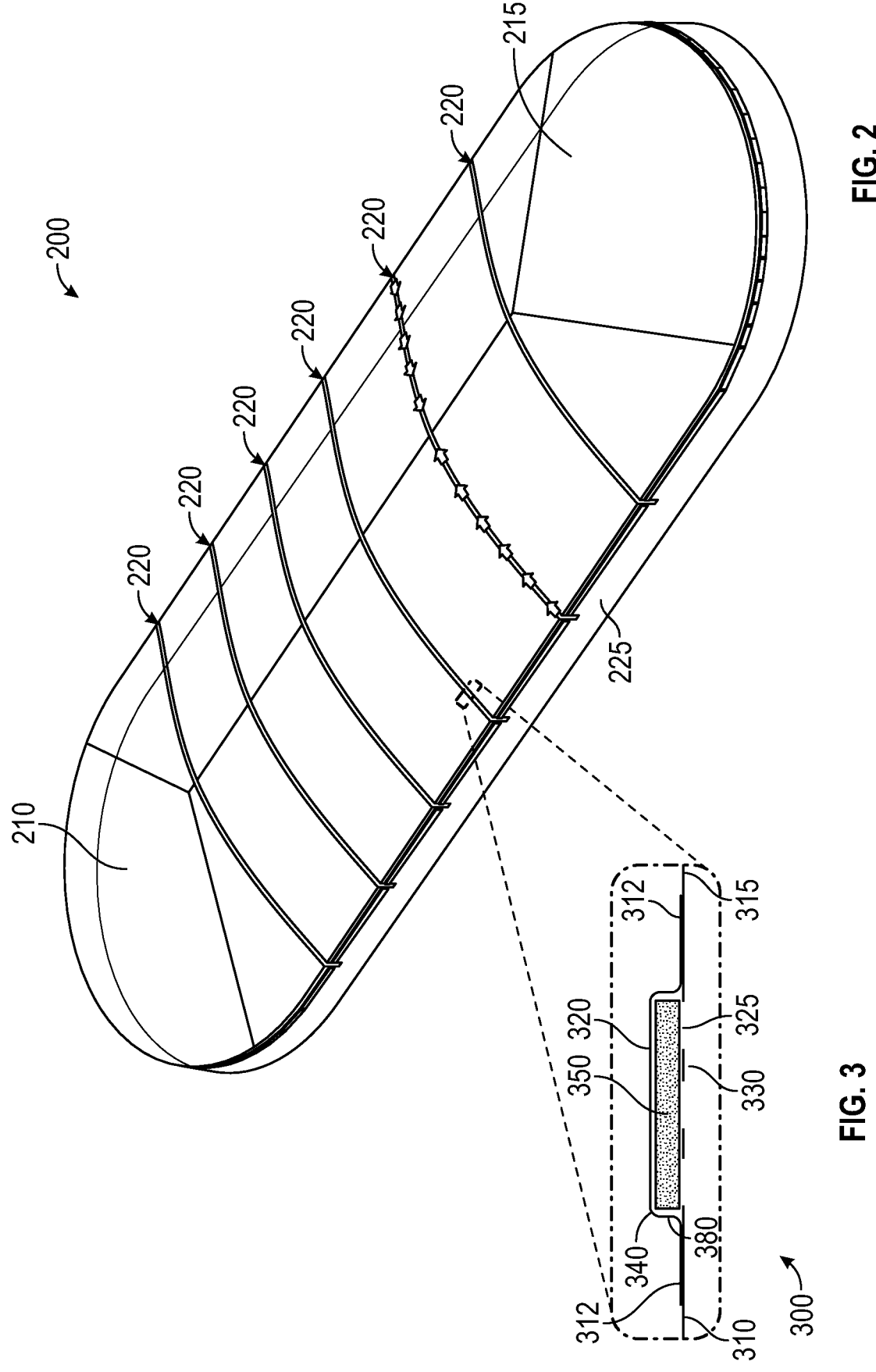
FIG. 2 illustrates is a perspective view of an example cover system according to embodiments of the present subject matter.
FIG. 3 illustrate a cross-sectional view of an example perforated tunnel according to embodiments of the present subject matter.

FIG. 2 illustrates a perspective view of an example cover system 200 according to embodiments of the present subject matter. The cover system 200 includes a cover 210 with one or more perforated tunnels 220 extending across at least a portion of the cover 210. In the illustrated example, the perforated tunnels 220 extend across an entire length of the cover 220 from one side to the other. In other examples, one or more of the perforated tunnels can extend over a partial portion of the cover 210. For example, a perforated tunnel can extend from a side of the cover to an intermediate location on the cover and/or between two intermediate locations on the cover. In one example, a first perforated tunnel can extend from one side of the cover to an intermediate portion of the cover and a second perforated tunnel can extend from the other side of the cover to an intermediate portion of the cover with a break in the middle of the cover between the first and second perforated tunnels. The cover 210 can, for example, be formed from multiple cover sections with one or more of the cover sections having one or more perforated tunnels 220. A perforated tunnel 220 can be formed in various manners with examples illustrated in FIGS. 3 and 10-12, discussed below. A cover section with a perforated tunnel 220 can, for example, include a bottom membrane with perforations and a cap strip membrane over the bottom membrane to form the tunnel 220. The two components can be heat sealed together using hot plates or hot air, for example. Each perforated tunnel 220 can further include an air permeable filler material between its bottom membrane and its cap strip membrane. An air inlet (not shown) can be formed at the end of each tunnel 220. FIG. 8A illustrates an example air inlet 810.

The air permeable filler material can be made from a variety of materials. In one example, the filler material is a crush-resistant filament material. In another example, the filler material is a composite fiber mesh such as the Cobra® Exhaust Vent for Roof Ridge material. In other examples, a strap (in addition to or in place of air permeable filler material) can extend through one or more tunnels 220 and be used to keep the tunnel 220 sufficiently open to permit airflow therethrough.

Each tunnel 220 (e.g., its cap strip membrane, filler material and bottom membrane with a strip of perforations) in the illustrated example generally extends from one side of the cover 210 to the other side. During installation, cuts can be made along the tunnels 220 (e.g., from the edge of the cover 210 inward) to allow portions of the cover 210 between tunnels 220 to be rolled up while leaving the perforated tunnels 220 extending beyond the rolled-up portions. A cut can be 2 to 4 feet long, leaving a 2-to-4-foot portion of a tunnel 220 exposed, for example. FIG. 9 illustrates various perforation patterns for a strip of perforations that can be used in the present subject matter. Perforations can extend the entire length of a tunnel or can be positioned at discrete locations within a tunnel. In one example, a strip of perforations (e.g., in any one or more of the patterns shown in FIG. 9) extends an entire length of a tunnel.

The cover 210 can be made in various ways using various materials. In one example, the cover 210 includes multiple sections of plastic sheeting welded together (e.g., overlapped and heat sealed) with one or more of the cover sections including one or more perforated tunnels. A section with a perforated tunnel(s) can, e.g., be a wide (e.g., 6 to 8 foot-wide) cover section that can be joined with other wide cover sections (with or without perforated tunnels) to form a full cover or cover panel. In another example, a cover section with a perforated tunnel(s) can be a narrow (e.g., 12 inch-wide) cover section that can join adjacent, wide cover sections (with or without perforated tunnels). The sections of plastic sheeting can have a much longer length than width (e.g., 200 feet in length). The cover 210, including the cap strip membrane and bottom membrane forming a perforated tunnel, can be made from polyethylene and in one example is made from a reinforced plastic sheeting such as Dura-Skrim®.

The cover 210 can further be formed from multiple panels welded together, with each panel including multiple (e.g., 3-4) cover sections and the cover 210 including one or more perforated tunnels 220. An example panel of cover sections can include three sections of 6.75-foot-wide plastic sheeting with one of the sections including a perforated tunnel. Another example panel can include three sections of 6.75-foot-wide plastic sheeting with at least one pair of adjacent sections being connected (e.g., heat welded) to a narrow section of cover membrane having a perforated tunnel. In yet another example, a first panel of wide cover sections (with or without perforated tunnels) can be connected to a second panel of wide cover sections using a narrow section of cover membrane having a perforated tunnel.

The cover system 200 can further include an aeration fan (not shown) (e.g., a fan or blower) for drawing air through the perforated tunnels 220. The aeration fan can be installed in a retaining wall 225 and exit to ambient. The aeration fan can further be connected to a perforated conduit system (not shown) typically installed beneath the product being stored. In operation, the aeration fan can draw air through the perforated tunnels 220 to hold the cover 210 down by suction. In each tunnel 220, air is drawn in through its inlet 260, flows through the tunnel perforations, then through the product, and then into the conduit system and out through the aeration fan.

Figures 10, 11:
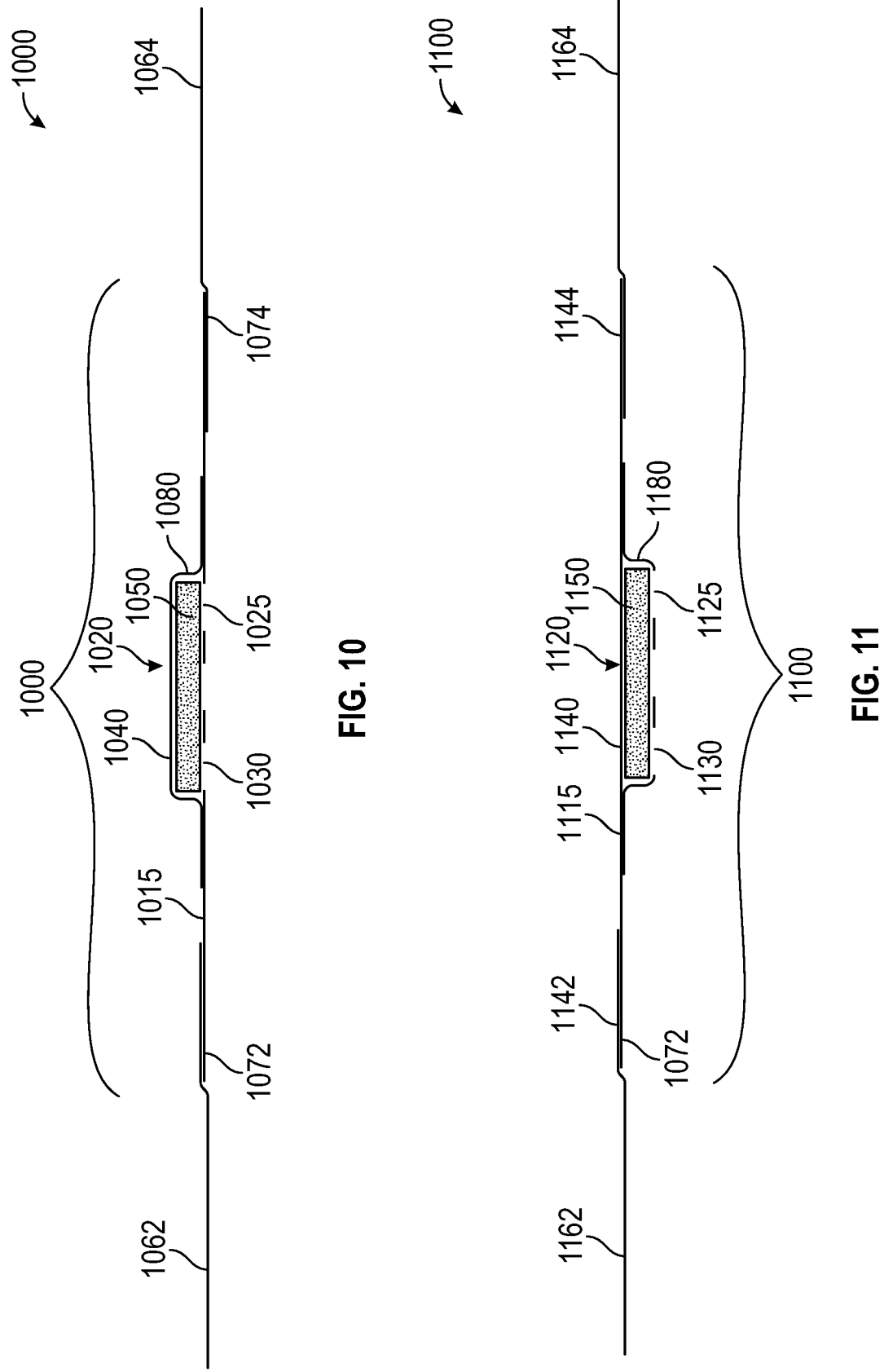
FIG. 10 illustrates another example perforated tunnel according to embodiments of the present subject matter.
FIG. 11 illustrates another example perforated tunnel according to embodiments of the present subject matter.

FIG. 3 illustrates an example perforated tunnel 320 according to embodiments of the present subject matter. The perforated tunnel 320 can for example be used as the tunnel 220 of FIG. 2. The perforated tunnel 320 can be part of a cover section 300 that includes a bottom membrane 325 with perforations 330 and a cap strip membrane 340 over the bottom membrane 325 to form the tunnel 320. The tunnel 320 can further include an air permeable filler material 350 between its bottom membrane 325 and its cap strip membrane 340. In this example, the cap strip membrane 340 forms a pocket 380 for holding the filler material 350. The cap strip membrane can be attached to the top side 315 of the bottom membrane 325. For example, edges 312 of the cap strip membrane 340 can be welded (e.g., heat sealed) against portions of the bottom membrane 325 to enclose the filler material 350. The cap strip membrane 340 can be formed from the same material (e.g., plastic sheeting) as the bottom membrane 325. The cap strip membrane 340 can serve as a cover for its respective tunnel 320, preventing moisture from entering a tunnel 320 which could spoil the product. The bottom membrane 325 can be a wide (e.g., 6 to 8 foot-wide) membrane of plastic sheeting or can be a narrow (e.g., 12 inch-wide) membrane of plastic sheeting (e.g., used to connect wide adjacent cover sections). An example of a narrow, perforated bottom membrane is illustrated in FIGS. 10 and 11.

Figure 12:
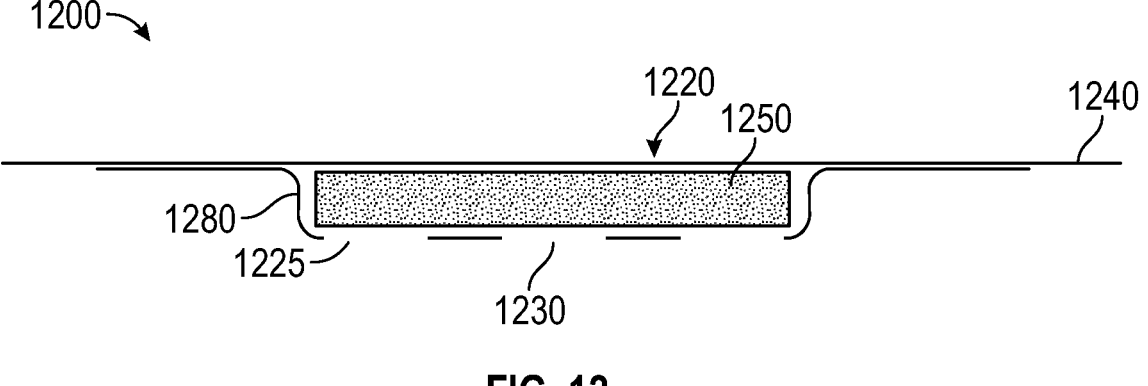
FIG. 12 illustrates another example perforated tunnel according to embodiments of the present subject matter.

FIG. 12 illustrates another example perforated tunnel 1220 according to embodiments of the present subject matter. The perforated tunnel 1220 can for example form a tunnel 220 of FIG. 2. The perforated tunnel 1220 is part of a cover section 1200 that includes a bottom membrane 1225 with perforations 1230 and a cap strip membrane 1240 over the bottom membrane 1225 to form the tunnel 1220. In one example, the cap strip membrane 1240 can be a wide membrane (e.g., 6 to 8 foot-wide) so that the cover section 1200 can be used with other wide cover sections to form a cover. In another example, the cap strip membrane 1240 can be a narrow (e.g., 12 inch-wide) membrane so that the cover section 1200 can be used to connect adjacent, wider cover sections. The tunnel 1220 can further include an air permeable filler material 1250 between its bottom membrane 1225 and its cap strip membrane 1240. In this example, the bottom membrane 1225 forms a pocket 1280 for holding the filler material 1 1250. The cap strip membrane 1240 can serve as a cover for its respective tunnel 1220, preventing moisture from entering a tunnel 1220 which could spoil the product.

Figure 4:
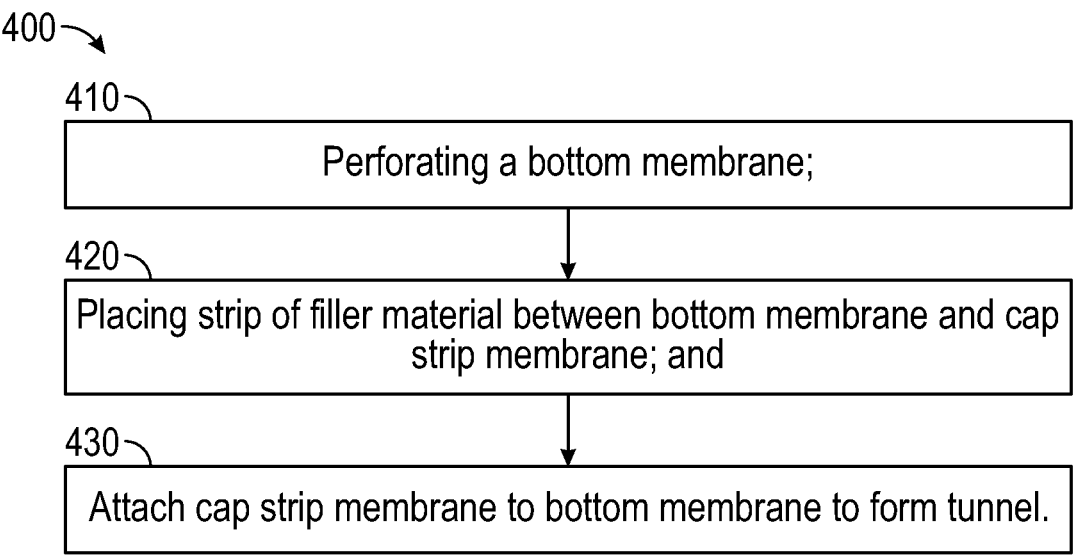
FIG. 4 illustrates an example cover manufacturing method according to embodiments of the present subject matter.

FIG. 4 illustrates a method 400 of manufacturing a cover system. The method includes perforating a bottom membrane at operation 410. This can include providing the membrane with a strip of perforations. The bottom membrane can be a long sheet of plastic such as Dura-Skrim for example. The strip of perforations can, for example, run a desired length (e.g., the full length) of the bottom membrane.

At operation 420, a strip of air permeable filler material is placed between the bottom membrane and a cap strip membrane. This can include placing the filler material adjacent the strip of perforations and the cap strip membrane adjacent the filler material. As noted above, the air permeable filler material can be a crush-resistant filament material. The cap strip membrane and filler material can run about same length as the perforation strip. In one example, operation 420 includes placing a filler material over a perforated bottom membrane and placing a cap strip membrane over the air permeable material. In another example, operation 420 includes placing a filler material over a cap strip membrane and placing a perforated bottom membrane over the air permeable material. The structure can then be inverted when used as a cover section so that the bottom membrane lies below the cap strip membrane when placed over a product being stored.

At operation 430, the cap strip membrane is attached to the bottom membrane to form a cover membrane (e.g., a wide or narrow cover section) with a perforated tunnel. This can be done by welding a portion on the cap strip membrane adjacent the filler material to a portion of the bottom membrane adjacent the filler material. In one example, edges of a narrower cap strip membrane can be welded to an intermediate portion of a wider bottom membrane (see, e.g., FIGS. 3 and 10). In other example, edges of a narrower bottom membrane can be welded to an intermediate portion of a wider cap strip membrane (see, e.g., FIGS. 11 and 12). The cap strip membrane and bottom membrane can be formed from the same material (such as a reinforced plastic sheet) and heat plates or hot air can be used to melt the materials together, for example. The cover membrane with a perforated tunnel can be a wide cover section (e.g., 6 to 8 foot-wide) or a narrow cover section (e.g., 12 inch-wide) used for connecting adjacent wider sections (with or without perforations). In some examples, operations 420-440 are used to provide multiple perforated tunnels in a cover membrane (e.g., a wide cover section).

The method 400 can further include cutting the cover membrane and its perforated tunnel(s) to a desired length. The cut membrane can then be rolled up into a master roll. The master roll (e.g., the rolled membrane and perforated tunnel) can further be cut into desired section lengths (e.g., 200 ft long). The cutting can provide an open end of the perforated tunnel at the cut edge of the cover membrane. The open end can form an air inlet for the tunnel. Master rolls of sheeting can also be formed without perforated tunnels and further cut into sections. Multiple sections from cut master rolls can further be welded to one another in a fabrication facility to form a cover panel that can then be used during installation. A cover panel can be formed from master rolls all having one or more perforated tunnels or a combination of master rolls with and without perforated tunnels can be made.

Figure 5:
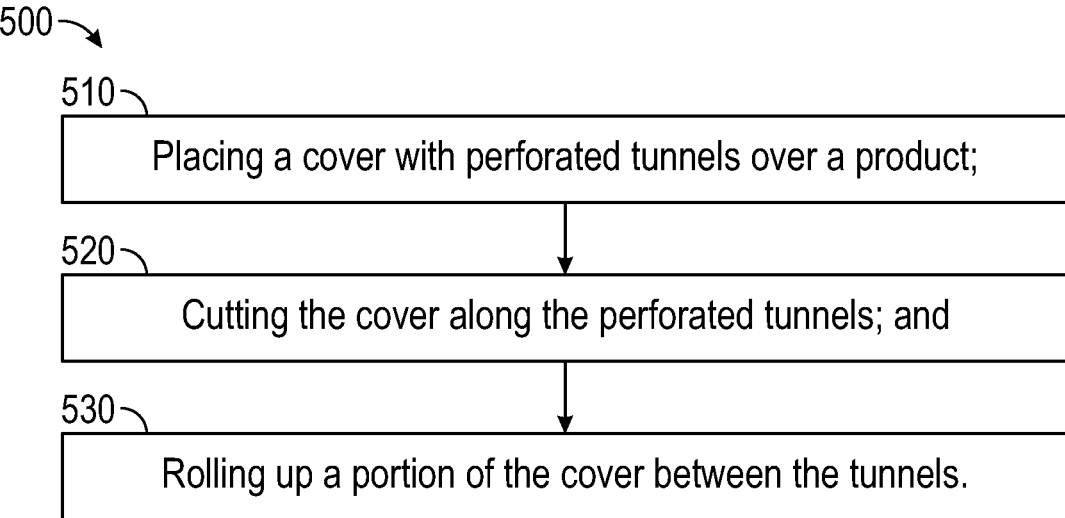
FIG. 5 illustrates an example cover installation method according to embodiments of the present subject matter.

FIG. 5 illustrates an example cover installation method 500 according to embodiments of the present subject matter. The method can be used to install a cover such as cover 210 over a product such as grain. The method includes placing a cover with perforated tunnels (e.g., such as tunnels 320, 1020, 1120, 1220) over the product at operation 510. In some examples, the cover can include multiple panels, and placing the cover over the product can include attaching (e.g., heat welding) panels to one another in the field. As noted above, a panel can be formed from multiple sections of cover membrane attached (e.g., welded) together in a fabrication facility, for example. One or more panels of the cover membrane can include one or more perforated tunnels. In some examples, each section of each panel includes one or more perforated tunnels. In other examples, adjacent wide cover sections are connected by a narrow (e.g., 12-inch wide) section of cover membrane having a perforated tunnel.

At operation 520, the cover is cut along the sides of at least two of the perforated tunnels. For example, from the edge of the cover, a 2-4-foot-long cut can be made along inside edges of two adjacent perforated tunnels. This can be done for most or all of the portions of the cover between perforated tunnels. FIGS. 6A and 6B illustrate a cover 600 with slits 602 cut along sides of a perforated tunnel 604. At operation 530, the portion of the cover between the two adjacent perforated tunnels can be rolled up. This portion can, for example, be rolled up in a piece of wood (e.g., a 2×4) and attached to a retaining wall 225 of the structure holding the product. This can also be done for most or all of the portions of the cover between perforated tunnels. FIGS. 7A and 7B illustrate a cover 700 with battens 702 placed adjacent a perforated tunnel 704 prior to the battens 702 being rolled up. Operation 530 can leave an end portion of a perforated tunnel with an air inlet extending beyond the rolled-up portion and extending beyond the retaining wall. FIGS. 8A and 8B illustrate a cover 800 with battens 802 rolled up and secured to a retaining wall 225, leaving an end portion 806 of a perforated tunnel 808 with an air inlet 810.

The method 500 can further include cutting an edge of the cover. This can be done before or after placing the cover over the product and can provide a cover with a desired length to fit over the structure. The cutting of an edge of the cover with a perforated tunnel can cut through the tunnel and provide an inlet at the edge of the cover. The method 500 can further include providing an aeration fan in the retaining wall of the structure and a conduit system near a bottom of the structure. Air can then be drawn in by the aeration fan with the air flowing in through an inlet of each perforated tunnel and the inlet a perforated tunnel. The drawn in air can hold the cover against the product using suction.

FIG. 10 illustrates an example perforated tunnel 1020 formed on a narrow cover section 1000 used to connect adjacent wider, cover sections 1062, 1064, according to embodiments of the present subject matter. The perforated tunnel 1020 includes a bottom membrane 1025 with perforations 1030 and a cap strip membrane 1040 over the bottom membrane 1025 to form the perforated tunnel 1020. The cap strip membrane 1040 can be attached to a top side 1015 of the bottom membrane 1025 using heat welding, for example. The perforated tunnel 1020 can further include an air permeable filler material 1050 between the bottom membrane 1025 and the cap strip membrane 1040. The filler material 1050 can be the same as the filler material described above. The bottom membrane 1025 can extend beyond the cap strip membrane 1040 and be welded at side locations 1072, 1074 to adjacent cover sections 1062, 1064. In this example, the cap strip membrane 1040 forms a pocket 1080 for the filler material 1050. The bottom membrane 1025, cap strip membrane 1040 and cover sections 1062, 1064 can be formed of the same material such as a reinforced plastic sheeting. In this way, the narrow, perforated section 1000 can be used to connect adjacent wider sections of a cover (e.g., cover 210). The width of the narrow cover section 1000 with the perforated tunnel 1020 can range from 9 to 18 inches for example and in some examples is 12 inches.

FIG. 11 illustrates an example perforated tunnel 1120 formed on a narrow section 1100 connecting adjacent, wider cover sections 1162, 1164, according to embodiments of the present subject matter. The perforated tunnel 1120 includes a bottom membrane 1125 with perforations 1130 and a cap strip membrane 1140 over the bottom membrane 1125 to form the perforated tunnel 1120. The cap strip membrane 1140 can be attached to a top side 1115 of a bottom membrane 1125. The perforated tunnel 1120 can further include an air permeable filler material 1150 between its bottom membrane 1125 and its cap strip membrane 1140. The filler material 1150 can be the same as the filler material described above. The cap strip membrane 1140 can extend beyond the bottom membrane 1125 and be welded at side locations 1142, 1144 to adjacent cover sections 1162, 1164. In this way, the narrow section 1100 can be used to connect adjacent wider, sections of a cover (e.g., cover 210). In this example, the bottom membrane 1125 forms a pocket 1180 for the filler material 1150. The bottom membrane 1125, cap strip membrane 1140 and cover sections 1162, 1164 can be formed of the same material such as a reinforced plastic sheeting. The width of the narrow cover section 1100 with the perforated tunnel 1120 can range from 9 to 18 inches for example and in some examples is 12 inches.

In some examples, a cover can use only suction through perforated tunnels to hold the cover down and in other examples, a cover can have both perforated tunnels for holding down the cover using suction and a strapping system for holding down the cover with straps. For example, a cover can be made from multiple cover sections where one or more of the cover sections includes one or more perforated tunnels and a strapping system. In other examples, a cover can be made from certain sections with perforated tunnel(s) and other sections with strapping systems. A variety of strapping systems can be used. These include straps within integral tunnels in the cover section or straps secured to the cover section without tunnels. Examples of the latter are provided in U.S. Provisional Nos. 63/247,946 (titled Covering and Strapping Systems and Methods and filed Sep. 24, 2021) and 63/253,802 (titled Covering and Strapping Systems and Methods and filed Oct. 8, 2021), both of which are incorporated herein by reference. In addition, straps can be provided within the perforated tunnels.

As mentioned earlier, by providing cover systems with perforated tunnels, the present subject matter can provide one or more of the following advantages. A cover system can be more efficiently made. For example, the present systems avoid the need to supply expensive and long tubes separate from the cover. The present systems can be more efficiently installed. For example, the present systems relying on integral perforated tunnels and eliminate the need for installers to install separate the unsightly, long tubes over the product during installation of the cover. The present systems also avoid the need for storing the long tubes in the off season. These and other advantages can be provided the system and methods described herein.

VARIOUS NOTES & ASPECTS

Cover System with Perforated Tunnels

Aspect 1 can include subject matter such as a cover system that includes a cover having at least one cover section with a perforated tunnel extending across a at least a portion of the cover section. The cover section includes a bottom membrane with perforations and a cap strip membrane attached to the bottom membrane. The cap strip membrane and bottom membrane define the tunnel therebetween. The cover section further includes an air permeable filler material in the tunnel between the bottom membrane and the cap strip membrane and an air inlet at an end of the tunnel.

Aspect 2 can include, or can optionally be combined with the subject matter of Aspect 1 to include, the bottom membrane having a strip of the perforations.

Aspect 3 can include, or can optionally be combined with the subject matter of any of Aspects 1 to 2 to include, the air permeable filler material lying adjacent to the strip of perforations.

Aspect 4 can include, or can optionally be combined with the subject matter of any of Aspects 1 to 3 to include, the bottom membrane having sides extending beyond the cap strip membrane. In this aspect, a first one of the sides is welded to a first adjacent cover section and a second one of the sides is welded to at a second adjacent cover section.

Aspect 5 can include, or can optionally be combined with the subject matter of any of Aspects 1 to 4 to include, the cap strip membrane forming a pocket for the filler material.

Aspect 6 can include, or can optionally be combined with the subject matter of any of Aspects 1 to 5 to include, the cap strip membrane having sides extending beyond the bottom membrane. In this aspect, a first one of the sides is welded to a first adjacent cover section and a second one of the sides is welded to at a second adjacent cover section.

Aspect 7 can include, or can optionally be combined with the subject matter of any of Aspects 1 to 6 to include, the bottom membrane forming a pocket for the filler material.

Aspect 8 can include, or can optionally be combined with the subject matter of any of Aspects 1 to 7 to include, the cover having multiple cover sections with one or more of perforated tunnels.

Aspect 9 can include, or can optionally be combined with the subject matter of any of Aspects 1 to 8 to include, the cover having a first wide section and a second wide section. In this aspect, the first wide section and second wide section are connected by the cover section having the perforated tunnel with the cover section having the perforated tunnel being narrower than the first and second wide sections.

Aspect 10 can include, or can optionally be combined with the subject matter of any of Aspects 1 to 9 to include, the cap strip membrane and bottom membrane being formed from the same material such as a reinforced plastic sheet.

Aspect 11 can include, or can optionally be combined with the subject matter of any of Aspects 1 to 10 to include, the air permeable filler material comprising a crush-resistant filament material.

Aspect 12 can include, or can optionally be combined with the subject matter of any of Aspects 1 to 11 to include, the tunnel extending from one side of the cover to the other side.

Aspect 13 can include, or can optionally be combined with the subject matter of any of Aspects 1 to 12 to include, an aeration fan for drawing air through the perforated tunnel.

Aspect 14 can include, or can optionally be combined with the subject matter of any of Aspects 1 to 13 to include, the end of the tunnel extending beyond a rolled-up portion of the cover.

Aspect 15 can include, or can optionally be combined with the subject matter of any of Aspects 1 to 14 to include, the at least one perforated tunnel and aeration fan configured to provide suction for holding down the cover against a product.

Method of Manufacturing a Cover System with Perforated Tunnels

Aspect 21 can include subject matter such as a method of manufacturing a cover system. The method can include a) perforating a bottom membrane with a strip of perforations; b) placing a strip of air permeable filler material adjacent the strip of perforations and between the perforated bottom membrane and a cap strip membrane; and c) attaching the cap strip membrane to the bottom membrane to form a cover membrane with a perforated tunnel having a bottom side with the strip of perforations.

Aspect 22 can include, or can optionally be combined with the subject matter of Aspect 21 to include, the air permeable filler material comprising a crush-resistant filament material.

Aspect 23 can include, or can optionally be combined with the subject matter of any of Aspects 21 to 22 to include, placing the strip of air permeable material where placing includes extending the material along a length of the bottom membrane.

Aspect 24 can include, or can optionally be combined with the subject matter of any of Aspects 21 to 23 to include, where placing includes placing the filler material over the perforated bottom membrane and placing the cap strip membrane over the filler material.

Aspect 25 can include, or can optionally be combined with the subject matter of any of Aspects 21 to 24 to include, where placing includes placing the filler material over the cap strip membrane and placing the perforated bottom membrane over the air permeable material.

Aspect 26 can include, or can optionally be combined with the subject matter of any of Aspects 21 to 25 to include, inverting the cover membrane so that the bottom membrane lies below the cap strip membrane.

Aspect 27 can include, or can optionally be combined with the subject matter of any of Aspects 21 to 26 to include, attaching the cap strip membrane to the bottom membrane where attaching includes welding a portion of the bottom membrane to a portion of the cap strip membrane.

Aspect 28 can include, or can optionally be combined with the subject matter of any of Aspects 21 to 27 to include, the cap strip membrane being narrower than the bottom membrane, and attaching the cap strip membrane to the bottom membrane where attaching includes welding edges of the narrower cap strip membrane to an intermediate portion of the wider bottom membrane.

Aspect 29 can include, or can optionally be combined with the subject matter of any of Aspects 21 to 28 to include, the cap strip membrane forming a pocket for the filler material.

Aspect 30 can include, or can optionally be combined with the subject matter of any of Aspects 21 to 29 to include, the bottom membrane having sides extending beyond the edges of the cap strip membrane. In this aspect, a first one of the sides is welded to a first cover section and a second one of the sides is welded to at a second cover section.

Aspect 31 can include, or can optionally be combined with the subject matter of any of Aspects 21 to 30 to include, the bottom membrane being narrower than the cap strip membrane, and attaching the cap strip membrane to the bottom membrane where attaching includes welding edges of the narrow bottom membrane to an intermediate portion of the wider cap strip membrane.

Aspect 32 can include, or can optionally be combined with the subject matter of any of Aspects 21 to 31 to include, the bottom membrane forming a pocket for the filler material.

Aspect 33 can include, or can optionally be combined with the subject matter of any of Aspects 21 to 32 to include, the cap strip membrane having sides extending beyond the edges of the bottom membrane where a first one of the sides is welded to a first cover section and a second one of the sides is welded to at a second cover section.

Aspect 34 can include, or can optionally be combined with the subject matter of any of Aspects 21 to 33 to include, the cap strip membrane and bottom membrane being formed from the same material such as a reinforced plastic sheet.

Aspect 35 can include, or can optionally be combined with the subject matter of any of Aspects 21 to 34 to include, rolling the cover membrane with the perforated tunnel into a master roll and cutting the master roll to form a cover section.

Aspect 36 can include, or can optionally be combined with the subject matter of any of Aspects 21 to 35 to include, forming a cover using multiple cover sections with perforated tunnels.

Aspect 37 can include, or can optionally be combined with the subject matter of any of Aspects 21 to 36 to include, providing an aeration fan for drawing air through the perforated tunnels of the cover.

Aspect 38 can include, or can optionally be combined with the subject matter of any of Aspects 21 to 37 to include, cutting the perforated tunnel and forming an end of the tunnel with an air inlet at an edge of the cover membrane.

Aspect 39 can include, or can optionally be combined with the subject matter of any of Aspects 21 to 38 to include, cutting the cover along sides of adjacent perforated tunnels and rolling up a portion of the cover between the adjacent perforated tunnels and leaving the perforated tunnels extending beyond the rolled up portion of the cover.

Method of Installing a Cover System with Perforated Tunnels

Aspect 40 can include subject matter such as a method of installing a cover system over a product. The method can include placing a cover over the product with the cover having multiple perforated tunnels including first and second perforated tunnels. The method can further include cutting the cover along a side of each of the first and second perforated tunnels and rolling up a portion of the cover between the first and second perforated tunnels.

Aspect 41 can include, or can optionally be combined with the subject matter of Aspect 40 to include, providing an aeration fan in a retaining wall of a structure and a conduit system near a bottom of the structure.

Aspect 42 can include, or can optionally be combined with the subject matter of any of Aspects 40 to 41 to include, drawing air in through an inlet of the first perforated tunnel and an inlet of the second perforated tunnel. The inlets can extend beyond the retaining wall and beyond the rolled-up portion of the cover.

Aspect 43 can include, or can optionally be combined with the subject matter of any of Aspects 41 to 42 to include, cutting an edge of the cover and providing an inlet for at least one of the first or second perforated tunnels at the edge of the cover.

Aspect 44 can include, or can optionally be combined with the subject matter of any of Aspects 41 to 43 to include, the cover having multiple panels, where placing the cover over the product includes welding a first of the multiple panels to a second of the multiple panels.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of installing a cover system over a product, comprising:

placing a cover over the product, the cover including multiple perforated tunnels including first and second perforated tunnels;

cutting the cover along a side of each of the first and second perforated tunnels; and rolling up a portion of the cover between the first and second perforated tunnels, further including cutting the cover along sides of adjacent perforated tunnels and rolling up a portion of the cover between the adjacent perforated tunnels and leaving the perforated tunnels extending beyond the rolled up portion of the cover.

2. The method of claim 1, further including providing an aeration fan at a retaining wall of a structure and a conduit system near a bottom of the structure.

3. The method of claim 2, further including drawing air in through an inlet of the first perforated tunnel and an inlet of the second perforated tunnel, the inlets of the first perforated tunnel and the inlet of the second perforated tunnel extending beyond the retaining wall and beyond the rolled-up portion of the cover.

4. The method of claim 1, cutting an edge of the cover and providing an inlet for at least one of the first or second perforated tunnels at the edge of the cover.

5. The method of claim 1, wherein the cover includes multiple panels, wherein placing the cover over the product includes welding a first of the multiple panels to a second of the multiple panels.

* * * * *